United States Patent
Kumada

(10) Patent No.: US 11,034,444 B2
(45) Date of Patent: Jun. 15, 2021

(54) FLIGHT MANAGEMENT SYSTEM FOR FLYING OBJECTS

(71) Applicant: BLUE INNOVATION Co., Ltd., Tokyo (JP)

(72) Inventor: Masayuki Kumada, Tokyo (JP)

(73) Assignee: Blue Innovation Co., Ltd., Tokyo (JP)

( * ) Notice: Subject to any disclaimer, the term of this patent is extended or adjusted under 35 U.S.C. 154(b) by 199 days.

(21) Appl. No.: 15/766,584

(22) PCT Filed: Oct. 7, 2016

(86) PCT No.: PCT/JP2016/079914
§ 371 (c)(1),
(2) Date: Apr. 6, 2018

(87) PCT Pub. No.: WO2017/061589
PCT Pub. Date: Apr. 13, 2017

(65) Prior Publication Data
US 2018/0290745 A1    Oct. 11, 2018

(30) Foreign Application Priority Data
Oct. 7, 2015  (JP) .............................. JP2015-199742

(51) Int. Cl.
*B64C 39/02* (2006.01)
*B64D 47/08* (2006.01)
(Continued)

(52) U.S. Cl.
CPC ............ *B64C 39/024* (2013.01); *B64C 39/02* (2013.01); *B64D 45/00* (2013.01); *B64D 47/08* (2013.01);
(Continued)

(58) Field of Classification Search
CPC ....... B64C 39/024; B64C 39/02; B64D 45/00; B64D 47/08; G05D 1/104; G08G 5/0013;
(Continued)

(56) References Cited

U.S. PATENT DOCUMENTS 3,944,986 A * 3/1976 Staples .................. B61L 17/00
104/88.04
2007/0220525 A1* 9/2007 State ...................... G06F 8/451
718/107

(Continued)

FOREIGN PATENT DOCUMENTS

JP    2004-291805 A    10/2004
JP    2013-060123      4/2013
JP    2014-059860 A    4/2014

OTHER PUBLICATIONS

International Search Report and Written Opinion, International Patent Application No. PCT/JP2016/079914, dated Jan. 10, 2017, with English translation of Search Report (7 pages).

*Primary Examiner* — Behrang Badii
*Assistant Examiner* — Daniel L Greene
(74) *Attorney, Agent, or Firm* — Hamre, Schumann, Mueller & Larson, P.C.

(57) ABSTRACT

A flight management system that manages flight conditions of a plurality of flying objects and that causes the flying objects to work together in a coordinated manner to accomplish a purpose. The flight management system includes a flight management apparatus that receives instruction information, that registers a job, and that based on the job, gives a motion instruction to one or more flying objects. The flight management system includes also a job generator that generates a job, and a motion instructor that gives a motion instruction to the flying object. The job generator includes a search system that retrieves a work-performing flying object, a route setter that derives a flight route for the
(Continued)

work-performing flying object, a time calculator that calculates a work time, and a registering system that registers a generated job.

12 Claims, 12 Drawing Sheets

(51) Int. Cl.
*B64F 1/36* (2017.01)
*B64D 45/00* (2006.01)
*G08G 5/04* (2006.01)
*G08G 5/00* (2006.01)
*G05D 1/10* (2006.01)
*G06Q 10/06* (2012.01)

(52) U.S. Cl.
CPC ............. *B64F 1/36* (2013.01); *G05D 1/104* (2013.01); *G08G 5/0013* (2013.01); *G08G 5/0034* (2013.01); *G08G 5/0043* (2013.01); *G08G 5/0069* (2013.01); *G08G 5/04* (2013.01); *G08G 5/045* (2013.01); *B64C 2201/123* (2013.01); *B64C 2201/146* (2013.01); *G06Q 10/06* (2013.01)

(58) Field of Classification Search
CPC .. G08G 5/0034; G08G 5/0043; G08G 5/0069; G08G 5/04; G08G 5/045
See application file for complete search history.

(56) References Cited

U.S. PATENT DOCUMENTS

| | | | |
|---|---|---|---|
| 2013/0046459 A1* | 2/2013 | Itakura | B64D 45/0031 701/301 |
| 2014/0025228 A1 | 1/2014 | Jang et al. | |
| 2014/0032034 A1* | 1/2014 | Raptopoulos | G05D 1/0088 701/25 |
| 2016/0140851 A1* | 5/2016 | Levy | G08G 5/0069 701/3 |
| 2017/0025023 A1* | 1/2017 | Goddemeier | G08G 5/0013 |
| 2017/0183097 A1* | 6/2017 | Miura | B33Y 30/00 |
| 2017/0197710 A1* | 7/2017 | Ma | G05D 1/0676 |
| 2018/0141676 A1* | 5/2018 | Suzuki | G06F 21/31 |

* cited by examiner

Fig. 4A

| FLYING OBJECT NUMBER | EQUIPMENT INFORMATION | STATUS INFORMATION |
|---|---|---|
| UAV-001 | EQ-001 | ST-001 |
| UAV-002 | EQ-002 | ST-002 |
| UAV-003 | EQ-003 | ST-003 |
| ⋮ | ⋮ | ⋮ |

Fig. 4B

| EQUIPMENT INFORMATION | EQUIPMENT NAME | EQUIPMENT POSITION |
|---|---|---|
| EQ-001 | CAMERA | LOWER PART |
| EQ-001 | IC TAG READER | FRONT PART |
| EQ-002 | CAMERA | UPPER PART |
| EQ-003 | CAMERA | LOWER PART |
| ⋮ | ⋮ | ⋮ |

Fig. 4C

| STATUS INFORMATION | TIME | CURRENT POSITION | REMAINING POWER | STATUS |
|---|---|---|---|---|
| ST-001 | 12:00 | *-* | 96% | WORKING |
|  | 13:00 | *-* | 31% | WORKING |
|  | 13:50 | *-* | 98% | WORKING |
|  | 14:00 | *-* | 97% | STANDING BY |
| ⋮ | ⋮ | ⋮ | ⋮ | ⋮ |

Fig. 4D

| JOB INFORMATION | JOB CONTENTS | AREA INFORMATION | JOB UNIT |
|---|---|---|---|
| JB-0100 | GUARDING/MONITORING (PHOTOGRAPHING) | MP-001 | 0101~0104 |
| JB-0100 | GUARDING/MONITORING (PHOTOGRAPHING) | MP-002 | 0105~0108 |
| JB-0200 | ROOF CHECK (PHOTOGRAPHING) | MP-002 | 0201~0208 |
| JB-0300 | SIDE CHECK (PHOTOGRAPHING) | MP-002 | 0301~0304 |
| ⋮ | ⋮ | ⋮ | ⋮ |

Fig. 4E

| REGISTERED INFORMATION | START TIME | END TIME | JOB INFORMATION | FLYING OBJECT NUMBER |   |
|---|---|---|---|---|---|
| 0001 | 12:00 | 13:00 | JB-0101 | UAV-001 |   |
| 0001 | 12:00 | 13:00 | JB-0102 | UAV-002 | ONE JOB (JB-0100) |
| 0001 | 12:00 | 13:00 | JB-0103 | UAV-003 |   |
| 0001 | 12:00 | 13:00 | JB-0104 | UAV-004 |   |
| 0002 | 13:00 | 14:00 | JB-0101 | UAV-005 |   |
| 0002 | 13:00 | 14:00 | JB-0102 | UAV-006 | ONE JOB (JB-0100) |
| 0002 | 13:00 | 14:00 | JB-0103 | UAV-007 |   |
| 0002 | 13:00 | 14:00 | JB-0104 | UAV-008 |   |
| ⋮ | ⋮ | ⋮ | ⋮ | ⋮ |   |

Fig. 10A
| JOB INFORMATION | JOB CONTENTS | AREA INFORMATION | JOB UNIT |
|---|---|---|---|
| JB-1000 | GUARDING/MONITORING (PHOTOGRAPHING) | MP-001 | 1001~0104 |
| JB-2000 | GUARDING/MONITORING (PHOTOGRAPHING) | MP-001 | 2001~2003 |
| JB-3000 | CHECKING (PHOTOGRAPHING) POINTS A TO D | MP-001 | 3001~3004 |
| JB-4000 | CHECKING (PHOTOGRAPHING) POINTS A | MP-001 | 4001 |
| JB-5000 | CHECKING (PHOTOGRAPHING) POINTS B | MP-001 | 5001 |
| JB-6000 | CHECKING (PHOTOGRAPHING) POINTS C | MP-001 | 6001 |
| JB-7000 | CHECKING (PHOTOGRAPHING) POINTS D | MP-001 | 7001 |
Fig. 10B
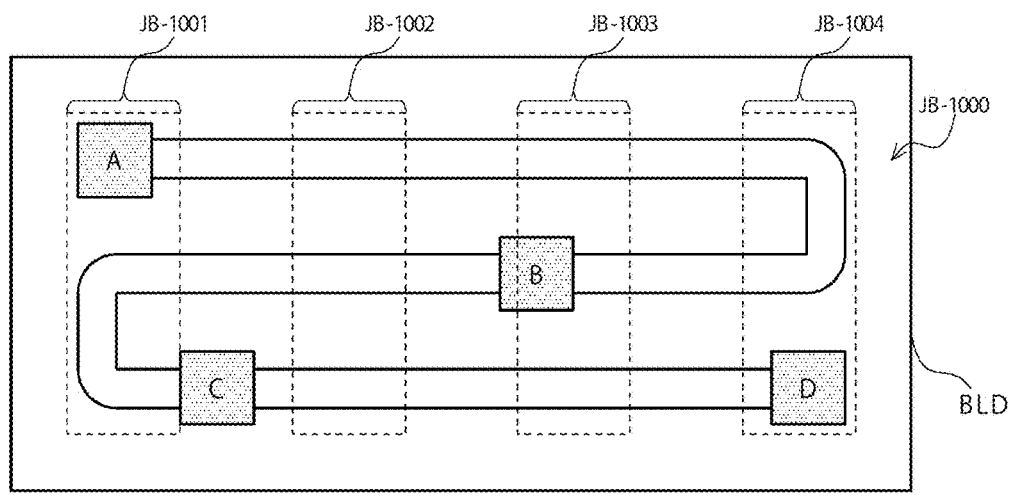
Fig. 10C
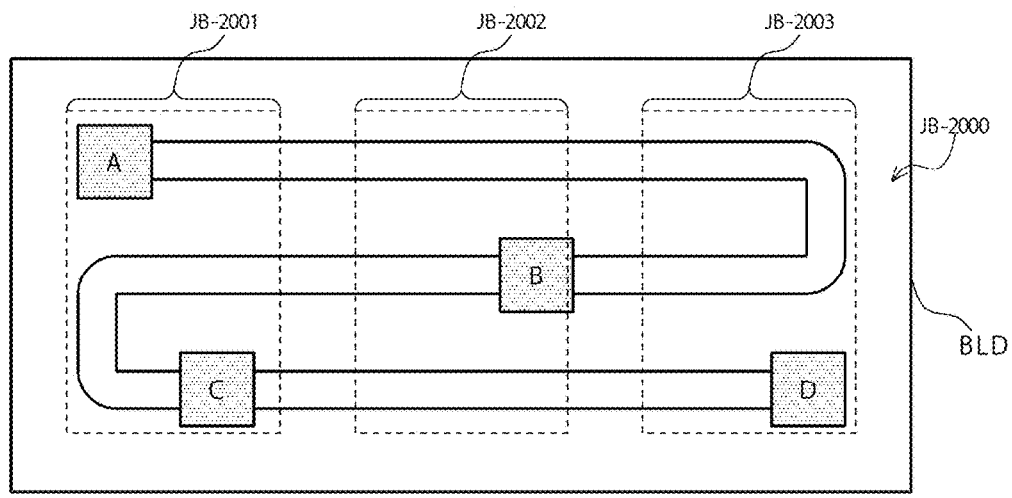

Fig. 12A

| JOB REGISTRATION>JOB LIST | |
|---|---|
| JOB CONTENTS: CHECKING POINTS A TO D (JB-3000), 4 JOB UNITS | |
| ● JOB 1 | 1/4 |
| WORK-PERFORMING FLYING OBJECTS: 4   SCHEDULED WORK TIME: 2:10<br>JOB BEING EXECUTED: SUSPENDED(DROP IN MONITORING LEVEL: MAJOR) | REGIST<br>RATION |
| ● JOB 2 | 2/4 |
| WORK-PERFORMING FLYING OBJECTS: 3   SCHEDULED WORK TIME: 4:00<br>JOB BEING EXECUTED: NUMBER OF FLYING OBJECTS IS REDUCED<br>FROM 4 TO 1 (DROP IN MONITORING LEVEL: MAJOR) | REGIST<br>RATION |
| ● JOB 3 | 3/4 |
| WORK-PERFORMING FLYING OBJECTS: 2   SCHEDULED WORK TIME: 5:20<br>JOB BEING EXECUTED: NUMBER OF FLYING OBJECTS IS REDUCED<br>FROM 4 TO 2 (DROP IN MONITORING LEVEL: MODEST) | REGIST<br>RATION |
| ● JOB 4 | 4/4 |
| WORK-PERFORMING FLYING OBJECTS: 1   SCHEDULED WORK TIME: 10:30<br>JOB BEING EXECUTED: NUMBER OF FLYING OBJECTS IS REDUCED<br>FROM 4 TO 3 (DROP IN MONITORING LEVEL: MINOR) | REGIST<br>RATION |

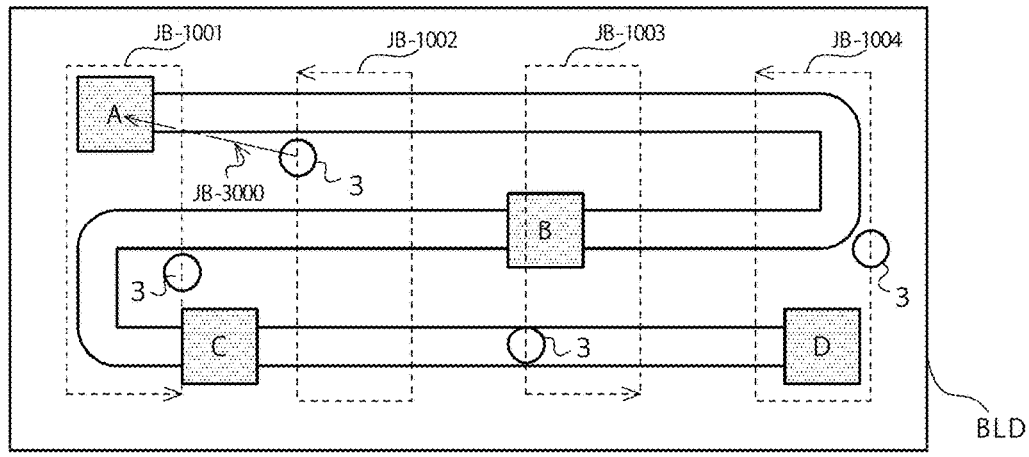

Fig. 12B

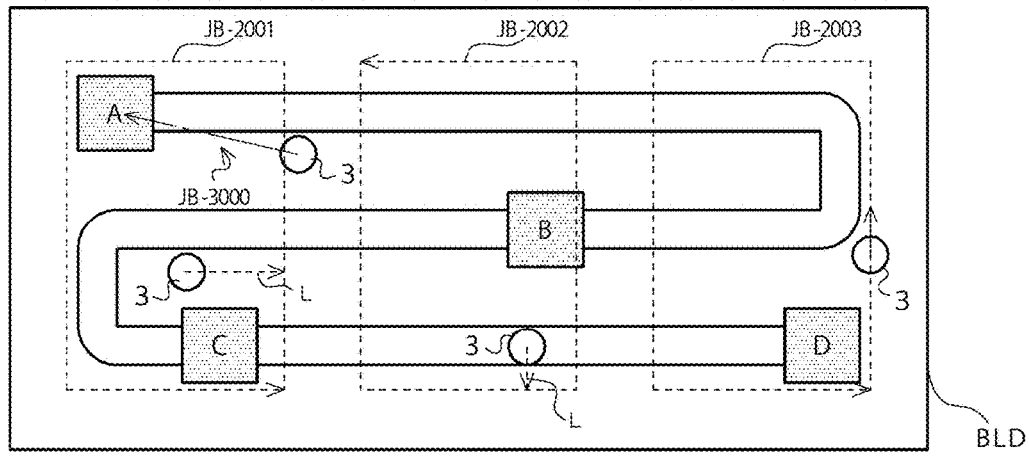

Fig. 12C

FLIGHT MANAGEMENT SYSTEM FOR FLYING OBJECTS

TECHNICAL FIELD

The present invention relates to a flight management system for flying objects, which flight management system manages flight conditions of a plurality of flying objects to accomplish intended work.

BACKGROUND ART

In the past, a flying object carrying no person was used mainly as a toy. In recent years, however, such an unmanned flying object is used for various purposes, such as spraying an agricultural chemical, taking an aerial photograph, checking a high place, and transporting materials. Development of such a flying object is in progress in many places, and demands for the flying object are expected to increase in future.

A system, which utilizes flying objects, is known, according which a flying object is caused to carry out monitoring work in a facility such that a guide line and a plurality of recognizable signals are drawn on the ceiling or floor surface and the flying object takes a picture of the guide line and signals to detect the position of the flying object and a direction in which the guide line extends (patent document 1).

This system allows the flying object to pilot itself along the guide line, thus allowing an unmanned flying object to carry out monitoring work in a facility.

PRIOR ART DOCUMENT

Patent Document

Patent document 1: Japanese Unexamined Patent Application Publication No. 2004-291805

SUMMARY OF THE INVENTION

Problems to be Solved by the Invention

According to the above conventional system, however, the autonomous flight flying object makes its motions alone. This system does not allow a plurality of autonomous flight flying objects to work together and accomplish an intended job, according to one motion instruction given to the flying objects. The system, therefore, offers low work efficiency and does not allow use of flying objects by which work is completed within a given time according to the motion instruction.

For example, monitoring work carried out by the conventional technique puts a single flying object in charge of monitoring, in which case its range of monitoring is limited. In such a case, by introducing as many flying objects as possible, the area of a work area that can be photographed simultaneously is increased to improve the quality of the monitoring work. In another case, causing a single flying object to patrol the entire floor area may achieve decent monitoring work. This case, however, leaves a blind spot, unchecked in the work area, and therefore leads to lower work quality.

Job results, such as work time reduction and work quality improvement, vary, depending on how many flying objects have been used in an intended job. Changing the number of flying objects to be used on a necessary basis, however, is an approach that has not been taken so far.

According to the conventional technique, the flying object is used for the monitoring work in the work area. The technique, however, is not applicable to an assumed case where the flying object that performs the monitoring work is given a different instruction to carry out a different job, such as facility maintenance check, article transfer, and product inspection (picking) in a warehouse.

The present invention has been conceived in view of the above circumstances, and it is therefore an object of the invention to provide a flight management system that manages flight conditions of a plurality of flying objects and that causes the flying objects to work together in a coordinated manner to accomplish a purpose.

Means for Solving the Problems

In order to solve the above problems, the present invention provides a flight management system that manages flight conditions of a plurality of flying objects and that gives a motion instruction. The flight management system comprises a flight management apparatus that receives instruction information for giving a motion instruction to flying objects, that registers a job based on performance information of a plurality of flying objects registered in advance and on status information on the current flight status of each flying object, and that based on the job, gives a motion instruction to one or more flying objects; a plurality of flying objects capable of communicating with the flight management apparatus, the flying objects each making a motion based on an incoming motion instruction; and an operating apparatus on which instruction information is entered to register a job. The flight management apparatus includes a status receiving means that stores received status information from the flying object; a job generating means that based on the instruction information, generates a job for giving a motion instruction to the flying object; and a motion instruction means that based on a registered job, gives a motion instruction to the flying object. The job generating means includes a search means that based on the instruction information, status information, and performance information, retrieves one or more work-performing flying objects; a route setting means that based on area information on an area where a work-performing flying object makes a motion and on the instruction information, derives at least part of a flight route along which the work-performing flying object flies; a time calculating means that calculates a work time the work-performing flying object takes to complete a job; and a registering means that registers a job.

This configuration enables execution of flight management by which a plurality of flying objects is controlled, based on flight conditions of the flying objects registered in advance and on entered instruction information, to accomplish an intended job.

According to this system, based on the flight status of a flying object and on the contents of a job in which the flying object takes part (or is taking part), another flying object to which a different job can be assigned is retrieved to cause the retrieved flying objected to carry out the different job.

According to a preferred embodiment of the present invention, the job generating means generates a plurality of jobs different from each other in the work-performing flying object assigned to a job and in the work time, based on one pieces of instruction information, and has a display means that regarding the generated jobs, causes the operating apparatus to output at least the number of work-performing flying objects derived by the search means and a work time calculated by the time calculating means. The registering means registers a job selected from the plurality of jobs output by the display means, as a job corresponding to received instruction information.

This configuration allows generating a plurality of jobs in response to one piece of instruction information and selecting an optimum job based on a work time for each job and on the number of work-performing flying objects. Thus, for example, a job for which a work time varies depending on the number of flying objects to be used, such as building/facility check, aerial photography, product transfer, and product inspection in a warehouse, can be specified effectively.

According to the preferred embodiment of the present invention, the route setting means judges a risk of collision of different flying objects, using at least either a flight route for a flying object that assumes an already registered different job or a flight route for a different flying object that takes part in the same job. When finding a risk of collision, the route setting means sets a different flight route.

This configuration prevents collision of a flying object against another flying object engaging in a different job in a case where the same job or different jobs is carried out using a plurality of flying objects.

According to the preferred embodiment of the present invention, the job generating means generates one job that is carried out by one flying object based on one piece of instruction information. The job generating means has a shortest job generating means that based on a plurality of pieces of entered instruction information, generates a plurality of jobs such that a total work time for the jobs is the shortest. Specifically, the job generating means has the shortest job generating means that based on a plurality of pieces of instruction information for giving instructions on a plurality of jobs to be carried out simultaneously, generates the plurality of jobs and further generates a job combination that makes a total work time for the generated jobs the shortest.

This configuration allows generating an optimum job in a case where one flying object carries out one job according to one piece of instruction information. For example, when a job corresponding to one piece of instruction information is made up of a set of sub-jobs or one flying object is caused to carry out a job of transferring an article located in a given place in a warehouse to a different place, a plurality of pieces of instruction information are entered to cause the shortest job generating means to generate an optimum job that the flying object accomplishes as the intended job.

According to the preferred embodiment of the present invention, the job generating means has an optimizing means that based on newly entered instruction information, performs job optimization in such a way as to change the contents of a different job to allow execution of a newly generated job.

This configuration allows changing the contents of a different job based on newly input instruction information to carry out all jobs effectively.

According to the preferred embodiment of the present invention, the job generating means has a job setting means that sets a job based on the instruction information, performance information, and area information, and the route setting means sets a flight route in a job set by the job setting means. According to the preferred embodiment of the present invention, the job generating means has a job unit generating means that based on a flight route set by the route setting means and on the performance information, sets a job unit as a work unit making up a job assumed by one flying object.

This configuration allows setting a job unit based on the instruction information, equipment information on a flying object, and work area information. For example, when a building is photographed for check/maintenance, a minimum work unit making up the job of building check/maintenance is set to specify a work-performing flying object.

According to the preferred embodiment of the present invention, the status information includes a flight possible time derived from the amount of remaining power of the flying object, and the search means retrieves a flying object that works for accomplishing a job, using the flight possible time.

This configuration allows registering a job based on the amount of remaining power of the flying object.

According to the preferred embodiment of the present invention, the performance information includes equipment information indicative of equipment the flying object carries, and the search means retrieves a flying object that works for accomplishing a job, using the equipment information.

This configuration allows registering a job based on equipment the flying object carries.

According to the preferred embodiment of the present invention, the flying object has an image-capturing unit, the performance information includes information on the direction of photographing by the image-capturing unit, and the search means retrieves a flying object that works for accomplishing a job, using the information on the direction of photographing.

This configuration allows causing the flying object to carry out a plurality of kinds of jobs, such as building check, aerial photography, and monitoring.

According to the preferred embodiment of the present invention, the flying object has an IC tag reader, and the performance information includes information on the direction of transmission of a read signal from the IC tag reader.

This configuration allows the flight management apparatus to cause the flying object to carry out work using the IC tag reader, such as picking work in a warehouse.

The present invention provides a flight management apparatus that receives instruction information for giving a motion instruction to flying objects, that registers a job based on performance information of a plurality of flying objects registered in advance and on status information on the current flight status of each flying object, and that based on the job, gives a motion instruction to one or more flying objects. The flight management apparatus includes a status receiving means that stores received status information from the flying object; a job generating means that based on the instruction information, generates a job for giving a motion instruction to the flying object; and a motion instruction means that based on a registered job, gives a motion instruction to the flying object. The job generating means includes a search means that based on the instruction information, status information, and performance information, retrieves one or more work-performing flying objects; a route setting means that based on area information on an area where a work-performing flying object makes a motion and on the instruction information, derives at least part of a flight route along which the work-performing flying object flies; a time calculating means that calculates a work time the work-performing flying object takes to complete a job; and a registering means that registers a generated job.

The present invention provides a computer readable medium comprising a flight management program for causing a computer to receive instruction information for giving a motion instruction to flying objects, to register a job based on performance information of a plurality of flying objects registered in advance and on status information on the current flight status of each flying object, and to give a motion instruction to one or more flying objects, based on the job. The flight management program causes the computer to function as: a status receiving means that stores received status information from the flying object; a job generating means that based on the instruction information, generates a job for giving a motion instruction to the flying object; and a motion instruction means that based on a registered job, gives a motion instruction to the flying object, wherein the job generating means includes a search means that based on the instruction information, status information, and performance information, retrieves one or more work-performing flying objects; a route setting means that based on area information on an area where a work-performing flying object makes a motion and on the instruction information, derives at least part of a flight route along which the work-performing flying object flies; a time calculating means that calculates a work time the work-performing flying object takes to complete a job; and a registering means that registers a generated job.

Effects of the Invention

The present invention provides a flight management system that manages flight conditions of a plurality of flying objects and that causes the flying objects to work together in a coordinated manner to accomplish a purpose.

BRIEF DESCRIPTION OF DRAWINGS

FIG. 4A-E depict an example of information stored in a storage unit according to the first embodiment of the present invention;

FIGS. 10A-C depict an example of job information according to a second embodiment of the present invention and set flight routes, including FIG. 10A showing an example of set job information, FIG. 10B showing a flight route for a case where four flying objects monitors the interior of a facility, and FIG. 10C showing a flight route for a case where three flying objects monitors the interior of a facility;

FIGS. 12A-C depict a screen displaying jobs generated under different flight conditions and set flight routes according to the second embodiment of the present invention, including FIG. 12A showing an example of a screen of an operating apparatus that displays a plurality of jobs generated under different conditions based on one piece of instruction information, FIG. 12B showing a flight route for a case where four flying objects monitors the interior of a facility, and FIG. 12C showing a flight route for a case where three flying objects monitors the interior of a facility.

MODES FOR CARRYING OUT THE INVENTION

First Embodiment

A flight management system for flying objects according to an embodiment of the present invention will hereinafter be described, referring to drawings. The embodiment to be described below is an example of the present invention. The present invention is, therefore, not limited to the embodiment to be described below. A first embodiment relates to an example in which flying objects are used to monitor the perimeter of a building and check the building.

Figure 1:
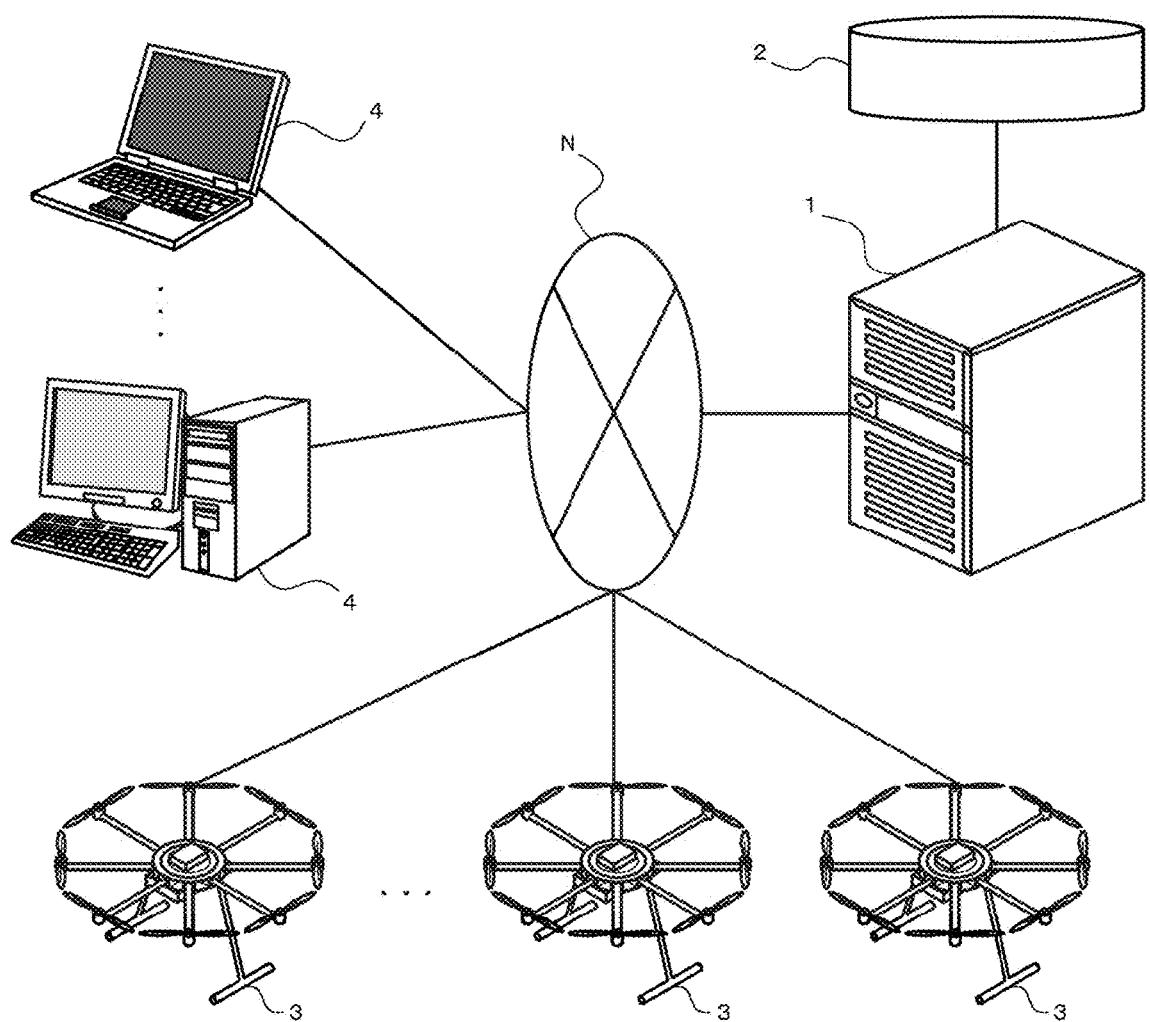
FIG. 1 depicts a flight management system according to a first embodiment of the present invention.

FIG. 1 is an overall view of a flight management system according to the first embodiment. Reference numeral 1 denotes a flight management apparatus that coordinates the flights of flying objects. Reference numeral 2 denotes a storage unit that stores necessary information when the flight management apparatus 1 coordinates the flights of the flying objects. Reference numeral 3 denotes one or more flying objects that make an intended motion upon receiving a motion instruction from the flight management apparatus 1 via a network N. Reference numeral 4 denotes an operating apparatus that gives an instruction to each flying object 3 via the network N and flight management apparatus 1.

In FIG. 1, the flight management apparatus 1, the flying object 3, and the operating apparatus 4 are interconnected through the network N. For example, the flight management apparatus 1 is connected to the flying object 3 through the network N and may be connected to the operating apparatus 4 through a network different from the network N.

Figure 2A:
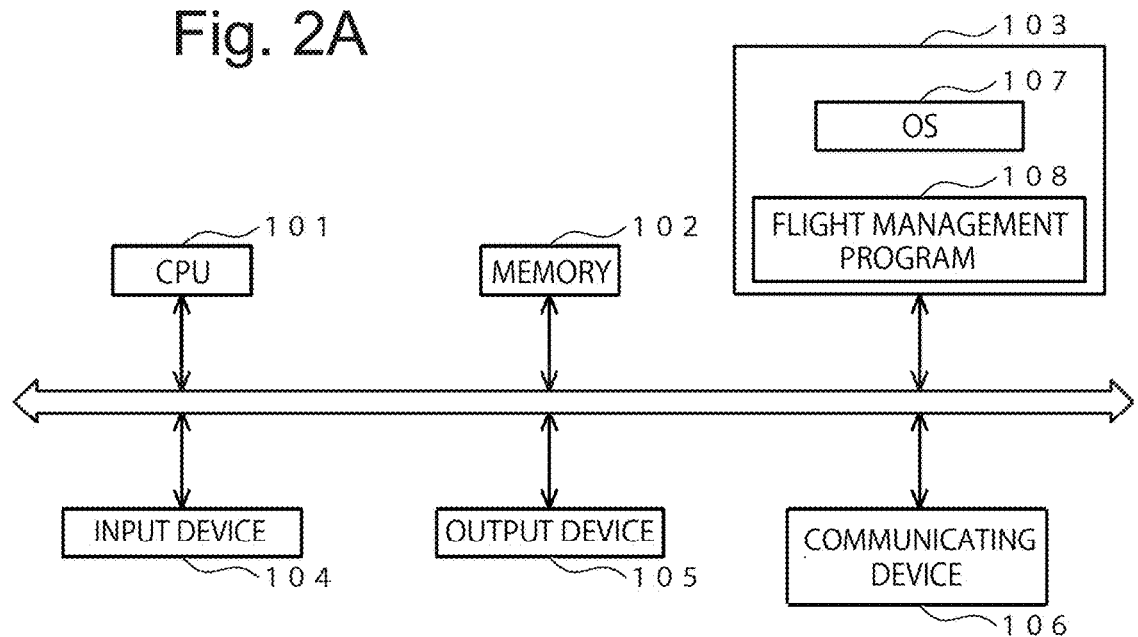
FIGS. 2A and 2B show a hardware configuration diagram of a flight management apparatus and that of a flying object according to the first embodiment of the present invention, including FIG. 2A showing the hardware configuration diagram of the flight management apparatus and FIG. 2B showing the hardware configuration diagram of the flying object.
Figure 2B:
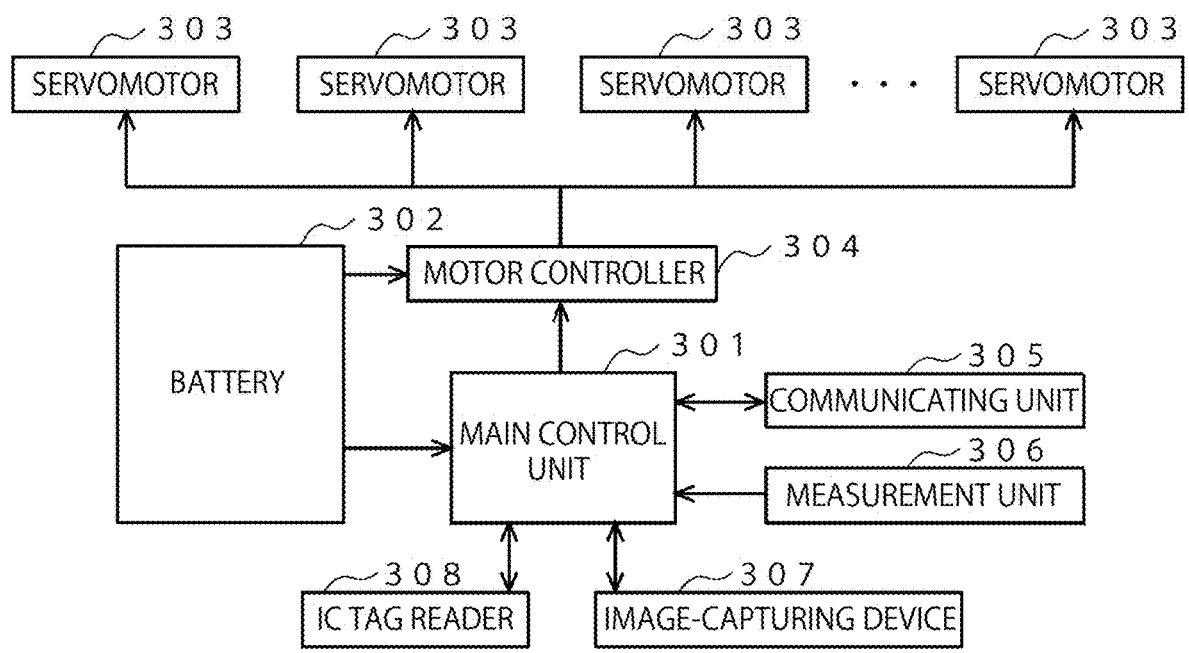

FIGS. 2A-2B show a hardware configuration diagram of the flight management apparatus 1 and that of the flying object 3. FIG. 2A is the hardware configuration diagram of the flight management apparatus 1, and FIG. 2B is the hardware configuration diagram of the flying object 3.

FIG. 2A is the hardware configuration diagram of the flight management apparatus 1. The flight management apparatus 1 includes a CPU 101, a memory 102, a recording device 103, an input device 104, an output device 105, and a communicating device 106 serving as an interface for communicating with an external device. The recording device 103 has recorded thereon an operating system (OS)

107 and a flight management program 108. The flight management program 108 exerts its function through coordination with the operating system 107.

FIG. 2B is the hardware configuration diagram of the flying object 3. The flying object 3 includes a main control unit 301 that controls the flight movement of the flying object 3, a battery 302 that supplies power used by the flying object 3, servomotors 303 that drive the wings of the flying object 3 to cause it to fly, a motor controller 304 that adjusts the amount of power supplied to the servomotors 303, based on a signal from the main control unit 301, a communicating unit 305 that communicates with the flight management apparatus 1 via the network N, a measurement device 306 that obtains status information of the flying object 3, such as the position and speed of the flying object 3 and the amount of power remaining in the flying object 3, and at least either an image-capturing device 307 that photographs an object or an IC tag reader 308 capable of reading an IC tag located within a given area.

The flying object 3 of this embodiment is a multi-copter that flies by driving its multiple wings by the servomotors 303. A flight method adopted by the flying object 3 of the present invention is not limited to a specific method.

According to this embodiment, the flying object 3 carries out SLAM (Simultaneous Localization and Mapping), using a camera, to estimate its position and create an environment map covering its surroundings, thereby performs autonomous flight. Any method may be adopted as a method of identifying the position of the flying object 3. For example, the position of the flying object 3 may be calculated from its initial position and acceleration, angular acceleration, etc., detected by a sensor, using an inertial navigation system. In the case of outdoor flight, a GPS (Global Positioning System) may be used. In another case, the position of each flying object 3 may be identified using a plurality of motion sensors. A combination of these multiple methods may also be adopted to determine the position of the flying object 3.

The motion of the flying object 3 is controlled by the main control unit 301. The main control unit 301 receives an incoming motion signal from the flight management apparatus 1 via the communicating unit 305. Receiving the motion signal, the main control unit 301, to cause the flying object 3 to make a motion corresponding to the incoming motion signal, gives an instruction to the motor controller 304 to cause it to change the amount of power supply to each servomotor 303, thereby causes the flying object 3 to travel to a given place specified by the motion signal, where the main control unit 301 puts the image-capturing device 307 or IC tag reader 308 into operation to collect information.

The flying object 3 outputs various pieces of information to the flight management apparatus 1, using the communicating unit 305 and the measurement device 306. For example, the flying object 3 outputs the remaining power capacity of the battery 302 and position information and status information, such as the speed and altitude of the flying object 3, obtained by the measurement device 306, to the flight management apparatus 1.

Figure 3:
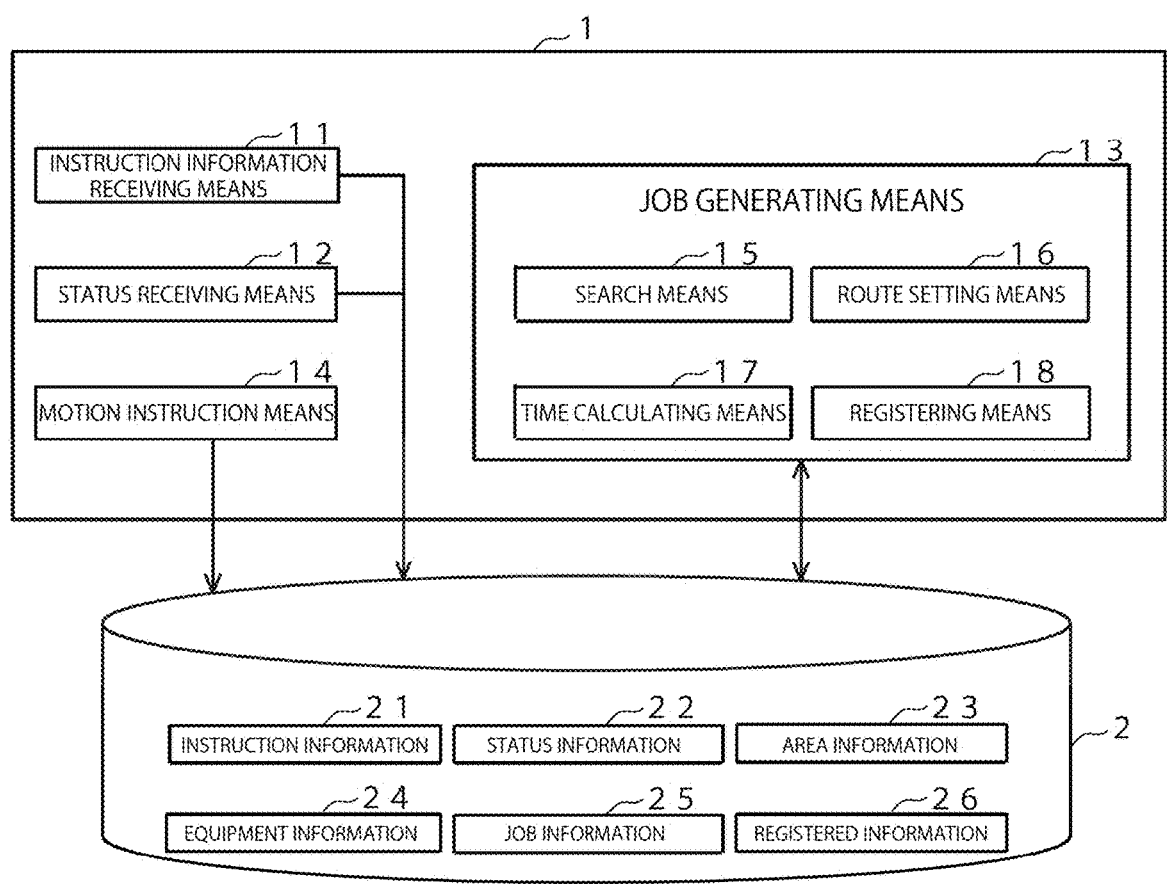
FIG. 3 is a functional block diagram of the flight management apparatus according to the first embodiment of the present invention.

FIG. 3 is a functional block diagram of the flight management apparatus 1. The flight management apparatus 1 includes an instruction information receiving means 11 that receives instruction information from the operating apparatus 4 for giving a motion instruction to the flying object 3, a status receiving means 12 that receives status information from the flying object 3, a job generating means 13 that generates a job based on the instruction information, etc., and that stores the generated job in the storage unit 2, and a motion instruction means 14 that based on a registered job (registered information) stored in the storage unit 2, gives a motion instruction to the flying object 3 to cause it to carry out the job.

The storage unit 2 stores therein instruction information 21 sent from the operating apparatus 4 through the instruction information receiving means 11 to the storage unit 2, status information 22 sent from the flying object 3 through the status receiving means 12 to the storage unit 2, area information 23 containing information on a map of an area where a job is carried out, equipment arrangement, etc., equipment information 24 on individual flying objects 3 that is stored in advance, such as the number of flying objects 3, equipment each flying object 3 carries, and the battery capacity (maximum flight time), job information 25 indicative of job contents, a minimum job unit (job unit), conditions for a flying object allowed to take part in a job, the start point, relay point, and end point of a job, and motions to make respectively at those points, and registered information 26 registered by the job generating means 13.

FIGS. 4A-E depict an example of information stored in the storage unit 2. FIG. 4A depicts an example of registered flying objects 3 and equipment information 24 and status information 22 of each flying object 3. As shown in FIG. 4B, each piece of equipment information 24 includes information on the type of equipment the flying object 3 carries, the position of the equipment, and the performance of the flying object 3, such as its battery capacity. As shown in FIG. 4C, each piece of status information 22 includes information on the position of the flying object 3, its remaining power, its flight status, and a time at which such information is obtained.

As shown in FIG. 4D, each piece of job information 25 includes information on an identification number for a registered job, the contents of the job, area information 23 indicating an area used for the job, and a job unit making up the job. According to this embodiment, an identification number for a job and area information 23 indicating an area where the job is carried out uniquely determine the contents of the job, such as what job is carried out where. As shown in FIG. 4E, each piece of registered information 26 includes information on the start time of a job, the (scheduled) end time of the job, the contents of the job (job identification number), and an identification number for a work-performing flying object that carries out the job. In this example, a job is divided into a plurality of job units, each of which is carried out by the flying object 3.

The area information 23 may include a plurality of pieces of information, in addition to information on a map of a work area. For example, the area information 23 may include flight-related information on a necessary basis, such as information on an area where flight is restricted by laws/regulations and an area where flight is allowed, on an area where mobile communication and GPS measurement can be made by the communicating unit 305 and measurement device 306 incorporated in the flying object 3 and an area where the mobile communication and GPS measurement cannot be made, on an outdoor area/indoor area, and on a dangerous area where an accident occurred in the past. Such information is used as job information 25 when a flight route is determined.

The job generating means 13 includes a search means 15 that retrieves a flying object 3 capable of carrying out a job, using entered instruction information 21 and equipment information 24 and status information 22 of a plurality of flying objects 3 that are stored in the storage unit 2, a route setting means 16 that sets a flight route for the flying object 3, a time calculating means 17 that calculates a work time required for a job, from job information 25 and the number of flying objects 3 that take part in the job, and a registering means 18 that registers a generated job as registered information.

Job information 25 includes contents information, such as the contents of a job (photographing, monitoring, picking, load transportation, etc.), a work unit (job unit) carried out by one flying object and making up the job, conditions for a flying object allowed to take part in the job, a flight route in an area including the start point, relay point, and end point of the job, and a work position (motion to make at each point). According to the embodiment, job information 25 may be set in advance and stored in the storage unit 2 or may be set when the job is registered as registered information 26.

For example, monitoring work in a facility, picking work in a warehouse, etc., can be carried out repeatedly if job information specifying one flight route is registered in advance. However, in a case where, for example, check work, etc., on an external building is carried out, using the flying object 3, to meet a request from a building administrator, etc., job information must be registered every time check work is carried out. It is preferable that when job information 25 is set, information on a flight route in particular be automatically derived by entering job contents, a work area, a work position, etc.

The job generating means 13 may include a job setting means. The job setting means sets job information 25, based on entered instruction information 21, and stores the set job information 25 in the storage unit 2. To set job information 25, job contents, a work area, a work position, etc., are entered. Instruction information 21 is not necessarily used for setting job information 25 but may be used as information for selecting a piece of job information 25 stored in advance in the storage unit 2 and causing the flying object 3 to carry out a job based on the selected job information 25.

The route setting means 16 automatically generates a flight route indicated by job information 25 set by the job setting means. Information on a flight route is automatically derived by entering job contents, area information 23 on a work area, a work position, weather information, etc. The route setting means 16, as it will be described later, also sets route-related factors, such as the stand-by position of the flying object 3 and traveling of flying object 3 from a job start point to a job end point, in addition to generation of the flight route indicated by the job information 25.

A job unit may be automatically set by the job setting means, based on a flight route taken during a job, equipment information 24 registered in advance (equipment the registered flying object 3 carries, the flying range of the flying object 3 based on its battery, etc.), the number of flying objects 3, etc., or may be set arbitrarily by the user, based on a set flight route.

Figure 5:
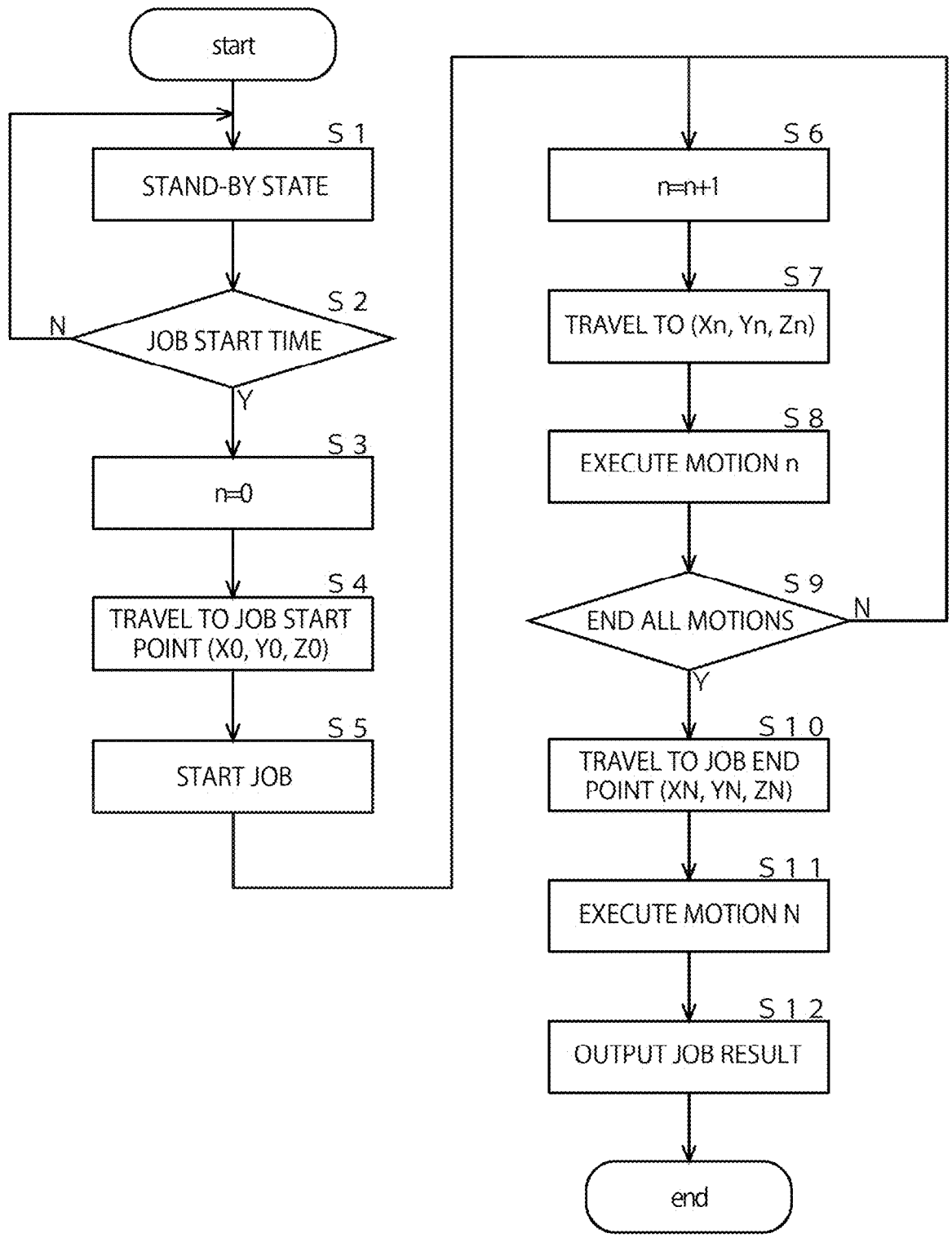
FIG. 5 is a flowchart of a process that the flying object of the first embodiment of the present invention executes when carrying out a job.

The flow of a process that the flying object 3 executes when carrying out a job unit will be described, referring to FIG. 5. At step 1 (S1), the flying object 3 is in a stand-by state. When a job start time arrives (YES (Y) at step 2 (S2)), n=0 is set (S3), and then the flying object 3 travels to a job start point (n=0) (S4), where the flying object 3 starts the job (S5).

At S6, the value of n is increased by 1, and then the flying object 3 travels to a relay point (n) (S7), where the flying object 3 executes a motion (n) to be made at the relay point (n) (S8). For example, in the case of checking a building, the flying object 3 photographs the building (makes the motion) while moving from one photographing point to another at given intervals at the relay point. The flying object 3 assigned to the job unit repeats these steps S6 to S8 until completing all the motions included in the job unit (S9).

In this manner, according to this embodiment, the flying object 3 travels and makes a motion as one step. Motions of the flying object 3 include, for example, standing by for a given time in order to avoid coming in contact with a different flying object 3 concurrently in motion, and reading an IC tag by the IC tag reader. Motion defined in this embodiment is not necessarily a motion involving any form of work but may be just a traveling motion with no work performance (that is, a motion of proceeding to the next step).

When finishing with all the motions included in the job unit (Y at S9), the flying object 3 travels to a job end point (S10), where the flying object 3 executes a motion to make at the job end point (S11). For example, the flying object 3 moves to a given stand-by position at which its battery 302 is charged. The flying object 3 then outputs information obtained through the job, to the flight management apparatus 1 and ends the job. The information obtained through the job is not always output to the flight management apparatus 1 but may be output to a different apparatus, such as the operating apparatus 4. The information obtained through the job, which is output usually after the end of the job, may be output while the job is in progress.

Figure 6A:
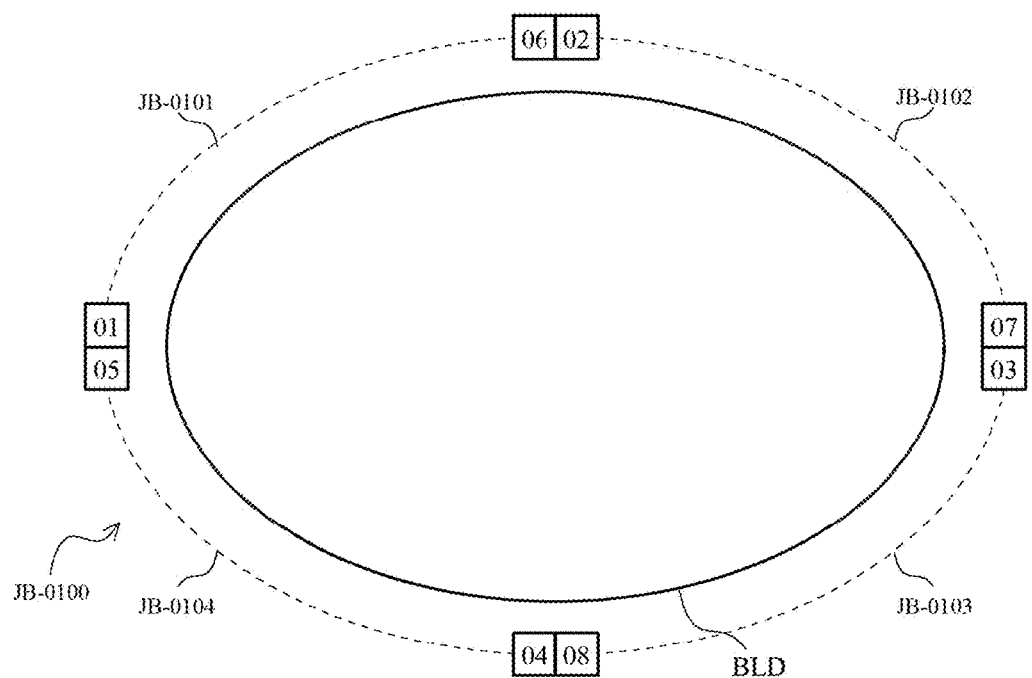
FIGS. 6A and 6B depict a job and job units according to the first embodiment of the present invention.
Figure 6B:
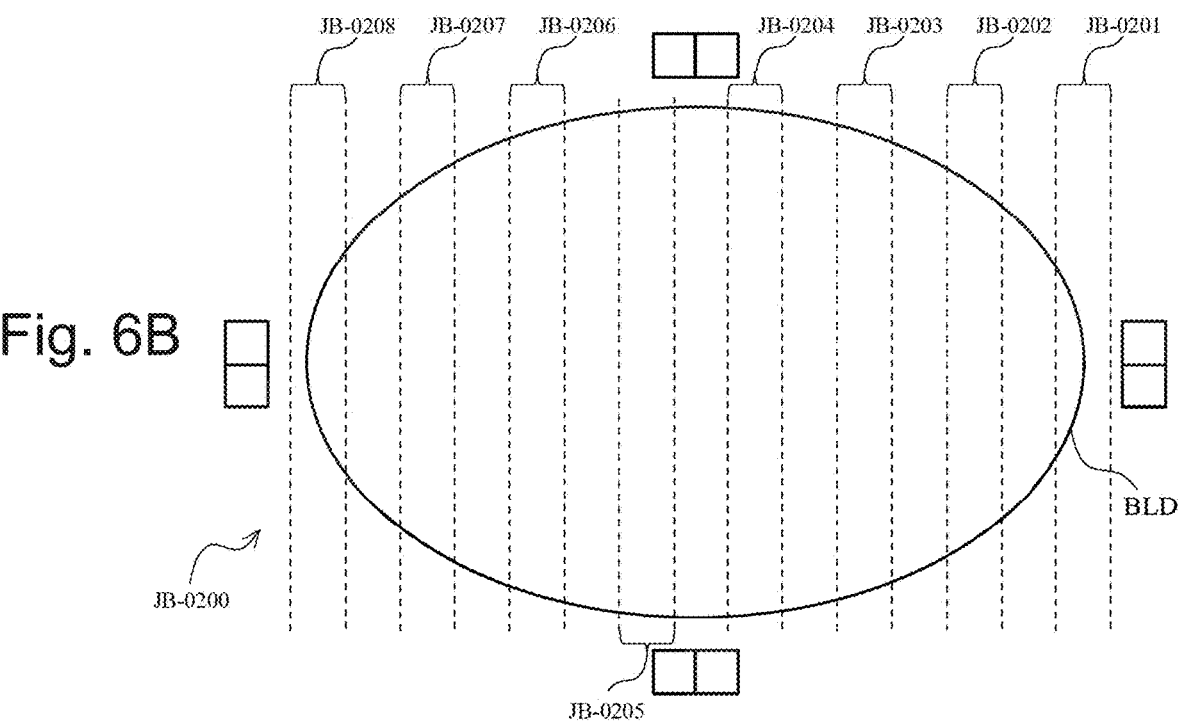

The relationship between a job and job units will then be described, referring to FIGS. 6A-B. FIG. 6A depicts a job of guarding/monitoring the perimeter of a building BLD and job units making up the job. Eight flying objects 3 (flying objects 01 to 08 in FIG. 6A) are arranged along the perimeter of the building BLD. The job is guarding/monitoring work carried out by using the image-capturing device 307 of the flying object 3, which is indicated in FIG. 4D, and is made up of four job units JB-0101 to JB-0104. One job unit is carried out by one flying object 3. Hence this job (JB-0100) is carried out using one flying object 3 at minimum to four flying objects 3 at maximum.

Each of four job units JB-0101 to JB-0104 represents a job of guarding/monitoring 1/4 of the perimeter of the building BLD. According to the example of registered information 26 shown in FIG. 4E, flying objects (UAV-001 to UAV-004) are caused to carry out the job (JB-0100) in the period between 12:00 and 13:00, and flying objects (UAV-005 to UAV-008) are caused to carry out the job (JB-0100) in the period between 13:00 and 14:00.

In this manner, by causing two or more groups of flying objects 3 to carry out guarding/monitoring work alternately, flying objects 3 in stand-by state can be supplied with power and checked for maintenance, which makes it possible to cause flying objects 3 to make guarding/monitoring motions in a continuous manner. Subdividing a job unit further into sub-job units allows execution of more detailed guarding/monitoring work using a plurality of flying objects 3. If one flying object 3 assumes a plurality of job units and carries out them, the job can be carried out by fewer flying objects 3.

It may be possible that a flying object 3 in stand-by state is caused to carry out a job other than the guarding/monitoring work depicted in FIG. 6A. For example, a case of carrying out facility check on the building BLD is shown in FIG. 6B. A job (JB-0200) shown in FIG. 6B is carried out such that the roof of the building BLD is photographed by the image-capturing device 307 to check the facility of the building BLD. The job is divided into eight job units JB-0201 to JB-0208. This job (JB-0200) is thus carried out using one flying object 3 at minimum to eight flying objects 3 at maximum.

Figure 7A:
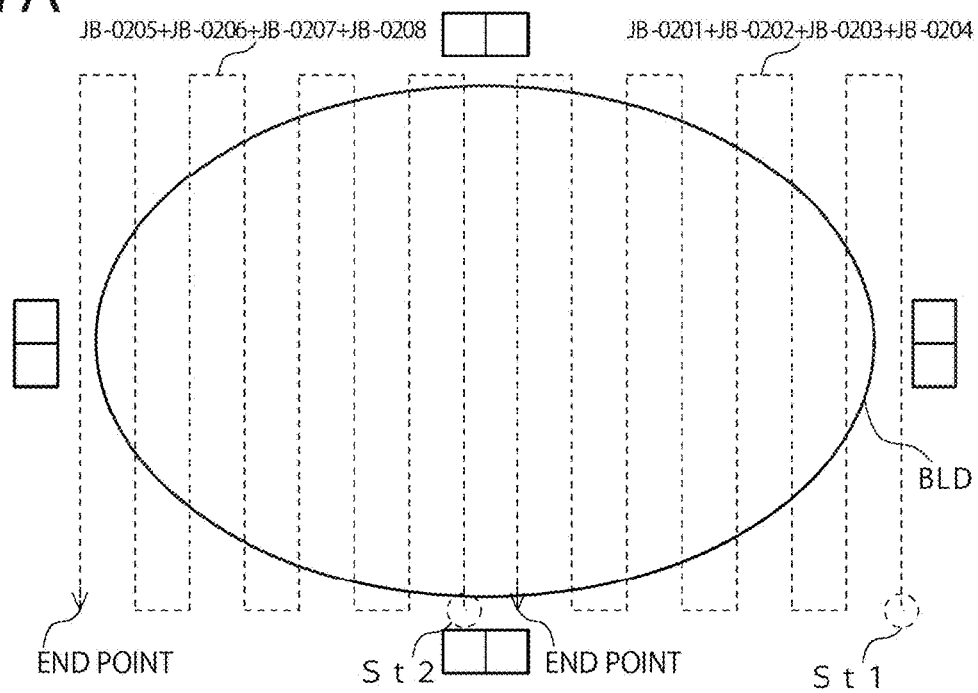
FIGS. 7A and 7B depict an example of job unit allotment that is made when a job is carried out by flying object groups different from each other in the number of flying objects according to the first embodiment of the present invention.
Figure 7B:
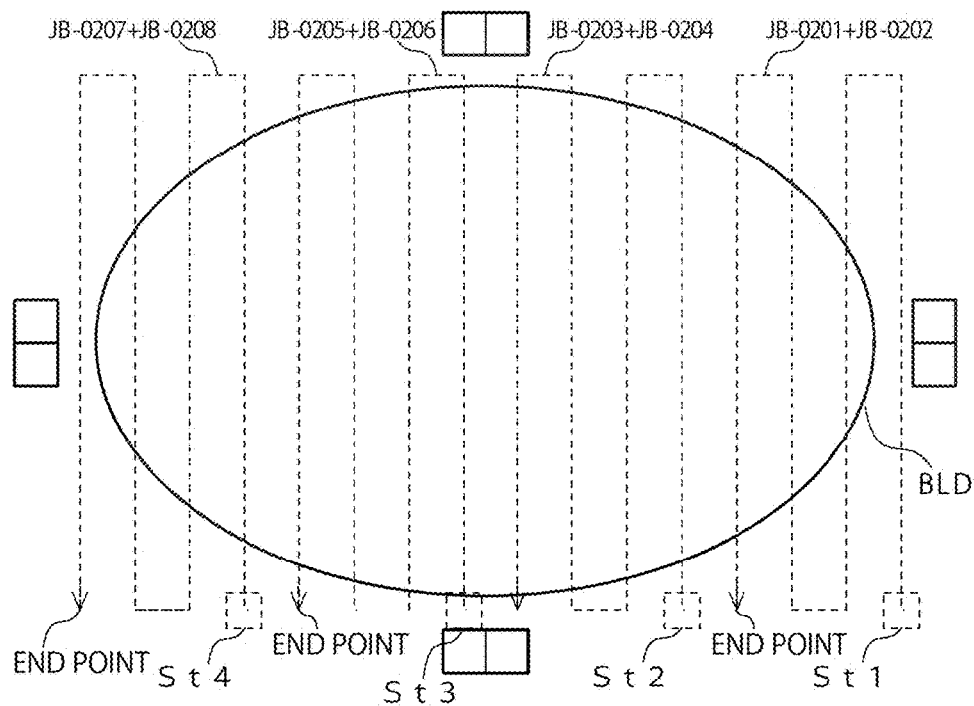

FIG. 7A depicts an example of traveling routes in a case where the job (JB-0200) is carried out using two flying objects 3, and FIG. 7B depicts an example of traveling routes in a case where the job (JB-0200) is carried out using four flying objects 3. The route setting means 16 calculates a traveling route of each flying object 3 between job units, the same between a stand-by point and a job start point (point St1 and point St4), and the same between a job unit end point and a stand-by point, and records the calculated a traveling route together with registered information. At a job start time, the flying object 3 travels to the start point based on the calculated traveling route. Along these routes for the job units, the flying object 3 travels given intervals one by one to make the motion (photographing in FIGS. 7A-B).

In this embodiment of the present invention, one job is not necessarily defined as a combination of a plurality of job units. For example, each of the job units (JB-0201 to JB-0208) making up the job (JB-0200) may be defined as an independent job to set eight jobs in total. This case offers the same effect as in the above case. When one job is carried out by one flying object, the flight management apparatus 1 may be provided with a shortest job generating means that based on a plurality of pieces of entered instruction information, generates a plurality of jobs for which a total work time is the shortest so that an effective job can be generated, referring to status information 22 and equipment information 24.

Figure 8A:
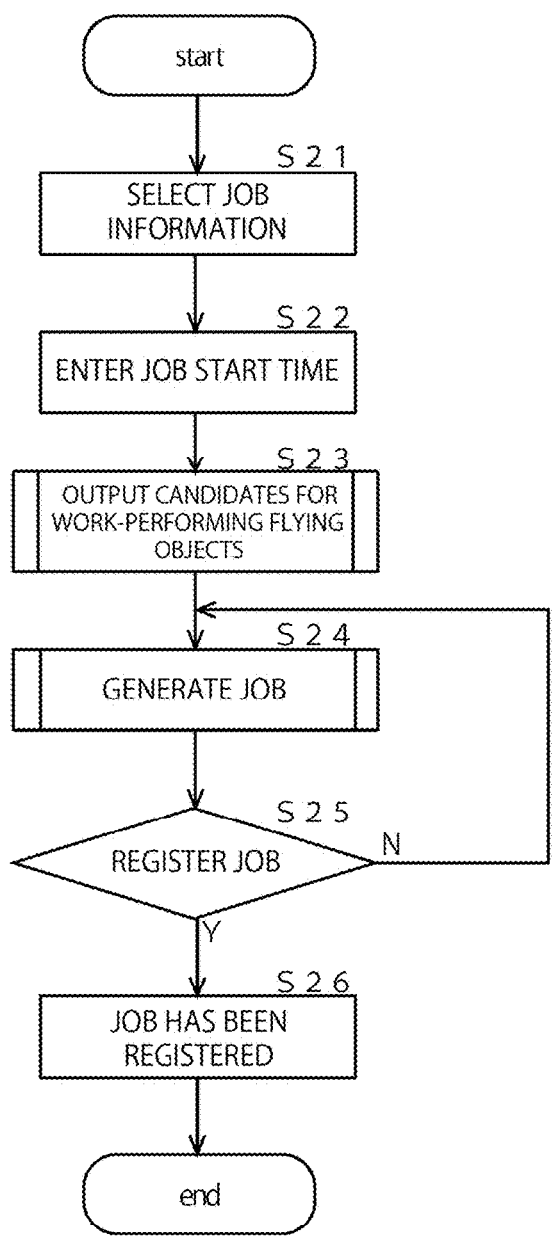
FIGS. 8A and 8B depict flowcharts of a process of registering a job according to the first embodiment of the present invention, including FIG. 8A showing a flowchart of the overall flow of the process of job registration and FIG. 8B showing a flowchart of a process of searching for a flying object.
Figure 8B:
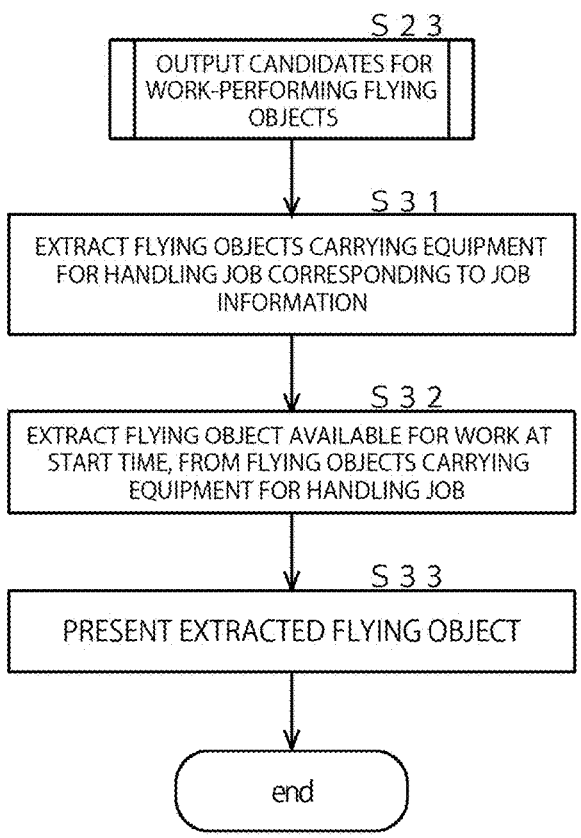
Figure 9:
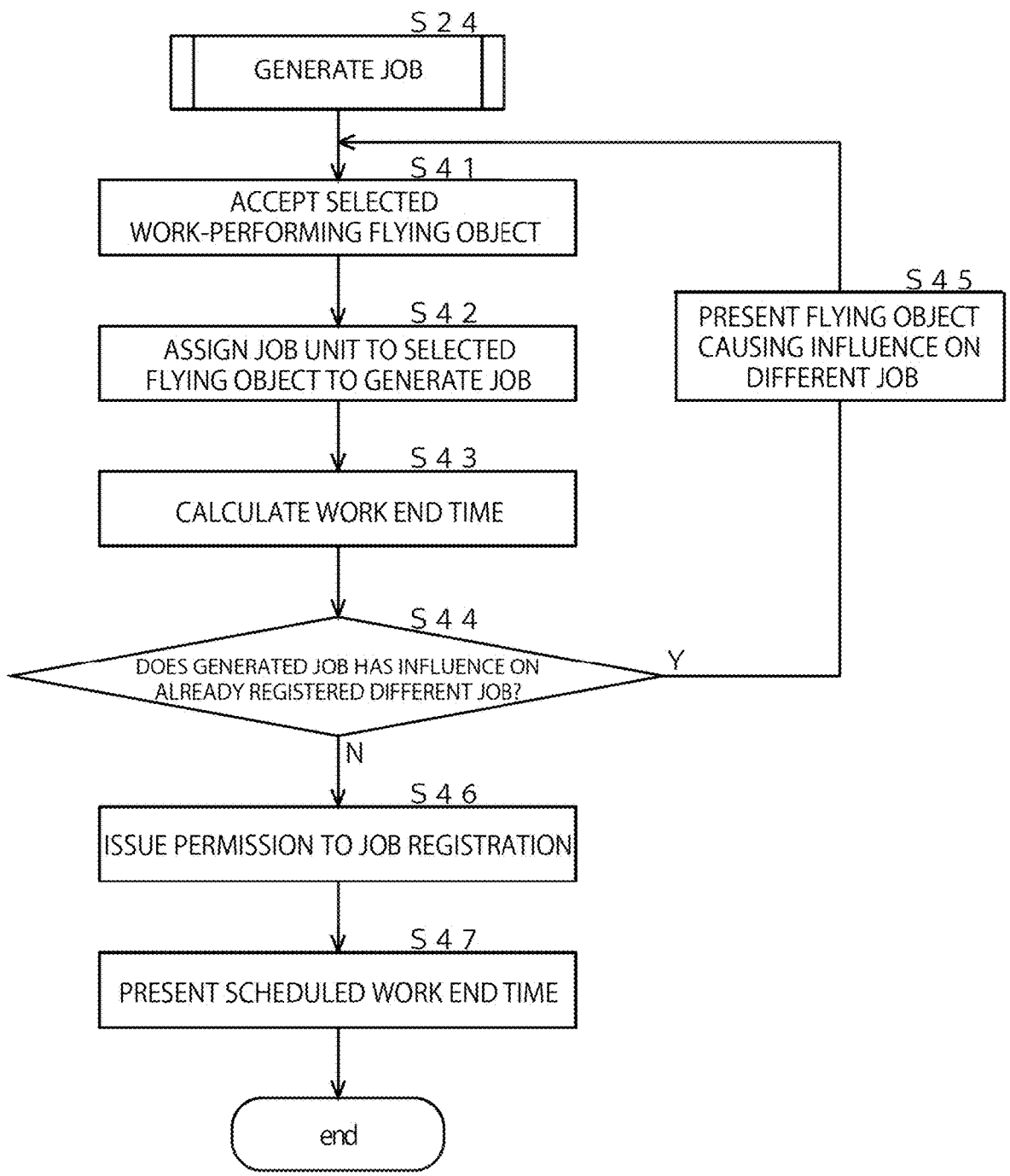
FIG. 9 is a flowchart of a process of generating a job according to the first embodiment of the present invention.

A flowchart of a process of entering instruction information 21 on the operating apparatus 4 to register a new job will be described, referring to FIGS. 8A-B. FIG. 8A is a flowchart of the overall flow of the process of job registration, and FIG. 8B is a flowchart of a process of retrieving a work-performing flying object that carries out a job, from flying objects 3 registered with the storage unit 2. FIG. 9 is a flowchart of a process of generating a job. A case where a piece of job information 25 stored in advance in the storage unit 2 is selected, based on instruction information 21, to register a job will be described.

At S21, the user first selects a piece of job information 25, using the operating apparatus 4. This selected job information 25 indicates an intended job that the user intends to carry out using a plurality of flying objects 3. In addition to the job information 25, the user also selects a piece of area information 23 indicating a location where the job is carried out, from area information 23 registered in advance. Selecting both job information 25 and area information 23 uniquely determines the job to be carried out by the flying objects 3.

A job carried out by using the image-capturing device 307 is, for example, guarding/monitoring the interior/exterior of a building, check/management of a building, etc. When a flying object 3 equipped with the IC tag reader 308 is registered, such a flying object 3 may be caused to carry out picking work in a warehouse, etc.

For example, the flying object 3 located in the warehouse is equipped with both the image-capturing device 307 and IC tag reader 308 and is caused to carry out different types of work in rotation, such as monitoring (photographing) the warehouse interior, picking work (IC tag reading) in the warehouse, and taking a stand-by position (being supplied with power). In another case, a flying object 3 in stand-by state may be caused to check and monitor (photograph) the facility interior several times in a month.

Having selected the job at S21, the user enters a start time for the job (S22). This start time indicates that the job is started right after registration of the job or that the job is started at a given start time. The start time may be entered so that the job is executed periodically at given intervals.

For example, a job of monitoring work, etc., must be carried out constantly. It is therefore preferable that the job be carried out regularly by groups of flying objects 3 that fly in rotation. In contrast, a job of building check, etc., does not need to be carried out constantly. In this case, carrying out the job in an emergency situation or several times in a month or once in several months is enough. When a job of check work is carried out, a job of monitoring work is carried out in a form different from its usual form such that several flying objects 3 used for the usual monitoring work are spared to assign more job units to one flying object 3. This allows the spared flying objects 3 to engage in the job of check work as the rest of flying objects 3 engage in the job of monitoring work.

When the job information 25 and the start time have been entered, candidates for work-performing flying objects are retrieved from the storage unit 2 (S23). FIG. 8B is a flowchart of a process of retrieving a work-performing flying object, which carries out the job, from flying objects 3 registered with the storage unit 2, using the search means 15. First, flying objects 3 carrying equipment for handling the job selected at S21 are extracted (S31). From the flying objects 3 carrying equipment for handling the job, which have been extracted at S31, flying objects 3 that are in stand-by state at the job start time entered at S22 are extracted (S32). The flying objects 3 extracted at S32 are then output as candidates for work-performing flying objects, to the operating apparatus 4, which presents them to the user (S33).

When the candidates for work-performing flying objects have been retrieved at S23, the process flow proceeds to S24, at which the job is generated. FIG. 9 is a flowchart of a process of generating a job. First, work-performing flying objects selected from the candidates for work-performing flying objects presented to the user at S33 are accepted (S41).

The selected work-performing flying objects are then assigned to job units making up the job selected at S21 to generate the job (S42). Assigning flying objects to job units does not always need to be carried out uniformly in such a manner as shown in FIGS. 7A-B. Flying objects may be assigned according to their individual performances, such as equipment information, flight durations, air speeds, and photographing speeds.

Job units and the start point, relay point, and end point of the job may be determined based on the contents of the job selected at S21, equipment information of flying objects registered in advance, and area information registered in advance. When one job is completed by one flying object 3, such as a case of causing one flying object 3 to transfer one product in a warehouse, one job unit is determined, which is, in this case, equivalent to the job as a whole.

When the job units have been assigned to the work-performing flying objects selected at S41, the end time of the job is calculated (S43). Subsequently, whether the job generated through steps S41 to S43 has an influence on a different job registered earlier is judged (S44). For example, when a different job in which the selected work-performing flying objects take part starts before the end time of the above job or when the work-performing flying objects are short of their flight durations (remaining power) necessary for them to take part in the different job, such cases have an influence on the different job registered earlier.

When an influence on the different job is confirmed (Y at S44), a flying object 3 causing an influence on the different job is output to the operating apparatus 4, which presents the flying object 3 to the user (S45), after which the process flow returns to S41, at which the user is prompted to reselect work-performing flying objects. Steps S42 and S43 are then executed again, which is followed by the judgment at S44.

When an influence on the different job is not confirmed (N at S44), the process flow proceeds to S46, at which permission to registration of the job is issued. Subsequently, a notification of permission to the job registration and the scheduled time of end of the job are output to the operating apparatus 4, which presents the notification and scheduled end time to the user (S47).

When seeing the presented job that can be registered, the user decides on whether or not to register the job (S25). When deciding to register the job (Y at S25), the user registers the job (S26) and ends the process. When deciding not to register the job (N at S25), the user ends the process without registering the job.

When job information 25 is set or a job is registered (registered information is generated), flight route setting, work-performing flying object assignment, etc., may be carried out based on weather conditions, current time, etc. The flight management apparatus 1 or operating apparatus 4 may have an application form creating auxiliary function for applying to a given institution for the flight of flying objects.

Second Embodiment

A flight management system according to a second embodiment of the present invention will then be described. The second embodiment relates to an example in which monitoring and emergency check of the facility interior are carried out using flying objects 3. When the need of emergency check arises, the contents of a monitoring job are changed to cause flying objects 3 having been engaging in the monitoring job to carry out an emergency check job. The flight management apparatus 1 of this embodiment includes a display means that causes the operating apparatus 4 to display a job with different conditions generated by the job generating means 13, and an optimizing means that changes the contents of a job being executed or a job not executed yet, by a newly registered job.

FIGS. 10A-C depict job information 25 set by the flight management system according to the second embodiment of the present invention and a flight route (job units) for each job. FIG. 10A depicts the set job information 25, FIG. 10B depicts a flight route (job units) for a job (JB-1000), and FIG. 10C depicts a flight route (job units) for a job (JB-2000).

According to this embodiment, flying objects 3 are caused to carry out monitoring and emergency check of the interior of the facility of the building BLD. Inside the facility, four flying objects 3 are arranged. In an ordinary situation, these four flying objects 3 monitor the facility interior, using their image-capturing devices 307, while flying along the flight route set for the job (JB-1000) shown in FIG. 10B. In this example, the amount of power remaining in the batteries 302 of the flying objects 3 is not taken into consideration.

A line is laid in the facility, where operations are carried out using the line. The line is marked with points A to D. If any problem arises at any one of these points, it is reported to an operator as an emergency notice. When receiving such an emergency notice, the operator selects any given number of flying objects 3 from the four flying objects 3 having been engaging in the monitoring work in the facility as required by the job (JB-1000). The operator then causes the selected flying objects 3 to carry out any one or more of jobs (JB-3000 to JB-7000), thus causing them to check (photograph) at least one or more of the points A to D to obtain image information.

Figure 11:
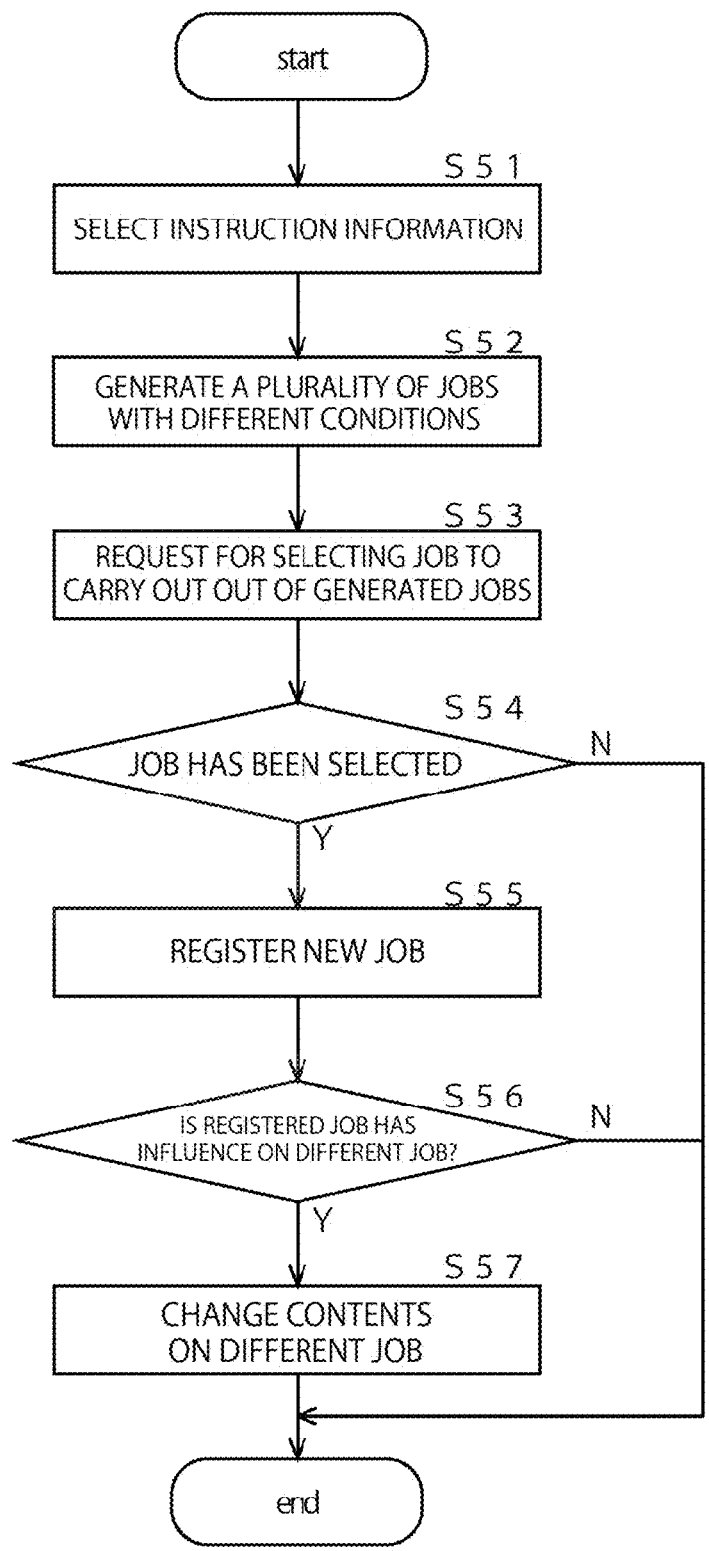
FIG. 11 is a flowchart of a process of registering a job according to the second embodiment of the present invention.

FIG. 11 is a flowchart of a process of changing the contents of a job based on a newly registered job. For example, a case is assumed where one flying object 3 is assigned to a check job (JB-3000) while three flying objects 3 are assigned to the monitoring job that has been carried out by the four flying objects 3. This case will be described, referring to drawings.

Receiving an emergency check request, the operator enters instruction information, such as job information, on the operating apparatus 4 to issue an emergency check instruction (S51). In this case, a job may be started right after its registration or started at a specified start time. The flight management apparatus 1 receives the instruction information via the instruction information receiving means 11. Based on the incoming instruction information, the job generating means 13 generates a plurality of jobs different in conditions. The flight management apparatus 1 then outputs the generated jobs different in conditions to the operating apparatus 4, using the display means, to let the operator select a job to carry out.

FIG. 12A shows an example in which a plurality of jobs generated according to entered instruction information are displayed on the operating apparatus 4, using the display means. According to this embodiment, the example indicates a total work time and effects on a different job for a case where one to four of the four flying objects 3 engaging in the monitoring work are diverted to the emergency check job.

The plurality of jobs generated by the job generating means 13 and displayed by the display means are jobs generated under different conditions. According to this embodiment, with four flying objects 3 arranged in the facility, the jobs are classified by the number of flying objects 3 that take part in each job, which is a condition for job generation, and are displayed as different jobs.

When jobs are expected to be classified into a greater number of cases, that is, a greater number of jobs are expected to be generated, a plurality of jobs may be displayed in order with a job requiring a shorter work time first. Jobs may also be classified by a different condition, such as the order of increase in the number of flying objects 3 in stand-by state, and a plurality of jobs generated under a plurality of conditions may be displayed. It is also possible that the operator enters allowable conditions, such as the latest work end time the operator allows and the maximum number of flying objects allowed to take part in the job, together with instruction information to set limits to the number of jobs to be generated.

For example, when all the four flying objects 3 are diverted to the check job (job 1 in FIG. 12A), the monitoring work is suspended, in which case, however, a time taken to complete the job is the shortest. When only two flying objects 3 are diverted to the check job (job 3 in FIG. 12A), the quality of the monitoring work drops a little but the emergency check work is completed relatively quickly. In this case, it is necessary to change the job (JB-1000) being executed into a different job in which two flying objects 3 are put in charge of four job units making up the job (JB-1000), using the optimizing means.

The operator selects a job to be carried out by the flying object 3 out of the plurality of displayed jobs and registers the selected job, using the registering means 18 (S54). When the selected job is canceled (N at S54), a process of registering a check job is ended. When a job is selected (Y at S54), the selected job is registered as a new job (check job) (S55). This example is assumed to be a case where the operator selects a job in which one flying object 3 is assigned to the check work (job 4 in FIG. 12A), thus causing one flying object 3 to carry out the job (JB-3000).

In this embodiment, the newly registered job (JB-3000) is assigned to a flying object 3 located closest to the point A (flying object having been engaging in a job unit JB-1002). The flying object 3 that assumes the newly registered job may be selected properly by the system, based on the position and equipment information of the flying object 3, or may be selected by the operator, who selects the flying object 3 from the displayed job list of FIG. 12A.

Following registration of the new job (check job) at S55, whether the registered job has an influence on a different job is judged (S56). When the registered job has no influence on the different job (N at S56), the process is ended. When the registered job has an influence on the different job (Y at S56), the contents of the different job are changed (S57), using the optimizing means, and then the process is ended.

The different job is a job being executed or a registered job not executed yet. In this example, the job (JB-1000) being executed is changed to a job (JB-2000) of carrying out monitoring work using three flying objects 3. FIG. 12B depicts a flight route along which four flying objects 3 are flying to carry out the job (JB-1000). FIG. 12C depicts a flight route for a case where one flying object 3 carries out the check job (JB-3000) while three flying objects 3 carry out the monitoring job (JB-2000).

The flying object 3 having been engaging in the job unit (JB-1002), as shown in FIG. 12B, travels to registered coordinates for photographing the point A (coordinates of the point at which the job (JB-3000) is started) to check (photograph) the point A, as shown in FIG. 12C. Meanwhile, three flying objects 3 having been engaging in job units (JB-1001, JB-1003, and JB-1004), as shown in FIG. 12B, each flying object travels to a point of start of each assigned job unit through a route L to carry out the monitoring job (JB-2000), as shown in FIG. 12C. Arriving at the start points, the three flying objects 3 carry out the job units (JB-2001, JB-2002, and JB-2003), respectively.

The route L, which is set by the route setting means 16, is the route for traveling from the end point of the job (JB-1000) to the start point of the job (JB-2000). In this example, the shortest route leading from the end point of the job (JB-1000) to the registered flight route for the job (JB-2000) is determined to be the route L. Thus, an intersection between the route L and the flight route for the job (JB-2000) is determined to be the start point of the job (JB-2000). The job start point may be a given position (coordinates) set in advance.

When the check job (JB-3000) is over, the monitoring job (JB-2000) may be changed to the original job (JB-1000) carried out by four flying objects 3.

The present invention allows flight management by which a plurality of flying objects is controlled, based on flight conditions of the plurality of flying objects registered in advance and on entered instruction information, to accomplish an intended job.

According to the present invention, the contents of a different job are changed, based on entered new instruction information, to carry out all jobs effectively. Through the search means, a proper job is assigned to a proper flying object, based on the amount of remaining power and equipment of registered flying objects.

A plurality of jobs is generated according to one piece of instruction information, and an optimum job is selected based on a work time for each job, the number of work-performing flying objects used for each job, etc. This allows effectively setting jobs for which work times change depending on the number of flying objects used, such as building/facility check, aerial photography, product transfer, and product inspection in a warehouse.

EXPLANATION OF LETTERS OR NUMERALS

1 flight management apparatus
11 instruction information receiving means
12 status receiving means
13 job generating means
14 motion instruction means
15 search means
16 route setting means
17 time calculating means
18 registering means
101 CPU
102 memory
103 recording device
104 input device
105 output device
106 communicating device
107 operating system
108 flight management program
2 storage unit
21 instruction information
22 status information
23 area information
24 equipment information
25 job information
26 registered information
3 flying object
301 main control unit
302 battery
303 servomotor
304 motor controller
305 communicating unit
306 measurement device
307 image-capturing device
308 IC tag reader
4 operating apparatus
N network
BLD building
L flight route

The invention claimed is:

1. A flight management system that manages flight conditions of a plurality of flying objects and gives a motion instruction, the flight management system comprising:
  a flight management apparatus that receives instruction information for giving a motion instruction to the flying objects registered in advance, that registers a job based on performance information of the plurality of flying objects and on status information on a current flight status of each of the flying objects, and that based on the job, sends a motion instruction to one or more of the flying objects;
  the plurality of flying objects each of which is capable of communicating with the flight management apparatus, the flying objects each making a motion based on an incoming motion instruction received from the flight management apparatus; and
  an operating apparatus in communication with the flight management apparatus to register a job, wherein
  the flight management apparatus includes:
  a status receiving means that stores received status information for each flying object;

a job generating means that based on one of the instruction information, generates a plurality of alternative jobs, each alternative job having a different number of the flying objects associated therewith that take part therein; and a motion instruction means that based on one of the alternative jobs sends a motion instruction to the flying object or the flying objects associated with the one alternative job, wherein the job generating means includes:

a search means that based on the instruction information, the status information, and the performance information, retrieves one or more of the flying objects;

a route setting means that based on area information on an area where the one or more retrieved flying objects are to operate and based on the instruction information, derives at least part of a flight route along which the one or more flying object is to fly;

a time calculating means that calculates a work time that the one or more flying objects take to complete a job;

a display means that causes the operating apparatus to output a list of the plurality of alternative jobs generated based on the one instruction information, each alternative job in the list includes a plurality of items, and the items include at least a number of the flying objects needed to perform the alternative job, a work time calculated by the time calculation means, and an effect on another job in progress; and a registering means that registers a job selected from the plurality of alternative jobs output by the display means, as a job corresponding to received instruction information.

2. The flight management system according to claim 1, wherein the route setting means judges a risk of collision of the flying objects, using at least either a flight route for one of the flying objects assigned to an already registered different job or a flight route for a different one of the flying objects that takes part in the same alternative job, and when finding a risk of collision, sets a different flight route.

3. The flight management system according to claim 1, wherein the job generating means has an optimizing means that based on newly entered instruction information, performs job optimization in such a way as to change contents of a different job to allow execution of a newly generated alternative job.

4. The flight management system according to claim 1, wherein the job generating means has a shortest job generating means that based on a plurality of pieces of instruction information for giving instructions on a plurality of jobs to be carried out simultaneously, generates the plurality of jobs and that further generates a job combination that makes a total work time for the generated jobs shortest.

5. The flight management system according to claim 1, wherein the status information includes a flight possible time derived from an amount of remaining power of the flying object, and wherein the search means retrieves one of the flying objects that works for accomplishing an alternative job, using the flight possible time.

6. The flight management system according to claim 1, wherein the performance information includes equipment information indicative of equipment that each flying object carries, and wherein the search means retrieves one of the flying objects that works for accomplishing an alternative job, using the equipment information.

7. The flight management system according to claim 1, wherein at least one of the flying objects has an image-capturing unit, wherein the performance information includes information on a direction of photographing by the image-capturing unit, and wherein the search means retrieves one of the flying objects that works for accomplishing an alternative job, using the information on the direction of photographing.

8. The flight management system according to claim 1, wherein at least one of the flying objects has an IC tag reader, and wherein the performance information includes information on a direction of transmission of a read signal from the IC tag reader.

9. The flight management system according to claim 1, wherein the job generating means has a job setting means that sets an alternative job based on the instruction information, the performance information, and the area information, and wherein the route setting means sets a flight route in alternative job set by the job setting means.

10. The flight management system according to claim 9, wherein the job generating means has a job unit generating means that based on a flight route set by the route setting means and on the performance information, sets a job unit as a work unit making up an alternative job assumed by one of the flying objects.

11. A flight management apparatus that receives instruction information for giving a motion instruction to flying objects registered in advance, that registers a job based on performance information of a plurality of the flying objects and on status information on a current flight status of each of the flying objects, and that based on the job, sends a motion instruction to one or more of the flying objects, the flight management apparatus includes:

a status receiving means that stores received status information for each flying object;

a job generating means that based on one of the instruction information, generates a plurality of alternative jobs, each alternative job having a different number of flying objects associated therewith that take part therein; and a motion instruction means that based on one of the alternative jobs sends a motion instruction to the flying object or the flying objects associated with the one alternative job, wherein the job generating means includes:

a search means that based on the instruction information, the status information, and the performance information, retrieves one or more of the flying objects;

a route setting means that based on area information on an area where the one or more retrieved flying object are to operate and based on the instruction information, derives at least part of a flight route along which the one or more flying object is to fly;

a time calculating means that calculates a work time that the one or more flying objects take to complete a job;

a display means that causes an operating apparatus to output a list of the plurality of alternative jobs generated for the one instruction information, each alternative job in the list includes a plurality of items, and the items include at least a number of the flying objects needed to perform the alternative job, a work time calculated by the time calculation means, and an effect on another job in progress; and a registering means that registers a job selected from the plurality of alternative jobs output by the display means, as a job corresponding to received instruction information.

12. A non-transitory computer readable medium comprising a flight management program for causing a computer to receive instruction information for giving a motion instruction to a plurality of flying objects registered in advance, to register a job based on performance information of the plurality of flying objects and on status information on a current flight status of each of the flying objects, and to send a motion instruction to one or more flying objects, based on the job, the flight management program causing the computer to function as:

a status receiving means that stores received status information for each flying object;

a job generating means that based on one of the instruction information, generates a plurality of alternative jobs, each alternative job having a different number of the flying objects associated therewith that take part therein; and a motion instruction means that based on one of the alternative jobs, sends a motion instruction to the flying object or the flying objects associated with the one alternative job, wherein the job generating means includes:

a search means that based on the instruction information, status information, and performance information, retrieves one or more of the flying objects;

a route setting means that based on area information on an area where the one or more retrieved flying object are to operate and based on the instruction information, derives at least part of a flight route along which the one or more flying object is to fly;

a time calculating means that calculates a work time that the one or more flying object take to complete a job;

a display means that causes the operating apparatus to output a list of the plurality of alternative jobs generated for the one instruction information, each alternative job in the list includes a plurality of items, and the items include at least a number of the flying objects needed to perform the alternative job, a work time calculated by the time calculation means, and an effect on another job in progress; and a registering means that registers a job selected from the plurality of alternative jobs output by the display means, as a job corresponding to received instruction information.

* * * * *